United States Patent [19]

Pinckney

[11] 4,212,491
[45] Jul. 15, 1980

[54] RESILIENT FLANGED WHEEL

[75] Inventor: Robert L. Pinckney, Glen Mills, Pa.

[73] Assignee: The Boeing Company, Seattle, Wash.

[21] Appl. No.: 948,004

[22] Filed: Oct. 2, 1978

[51] Int. Cl.² ............................................. B60B 17/00
[52] U.S. Cl. ......................................... 295/11; 295/7;
    295/18; 295/19; 151/5; 151/23
[58] Field of Search .................. 295/7, 11, 15, 19, 21,
    295/18; 152/18, 40–50, 323–324, 301–303;
    151/5, 8, 23

[56] References Cited
U.S. PATENT DOCUMENTS

| | | | |
|---|---|---|---|
| 1,154,265 | 9/1915 | Miller | 151/23 |
| 1,315,107 | 9/1919 | Fitzpatrick | 151/3 |
| 2,274,504 | 2/1942 | Shepherd | 151/8 |
| 2,540,571 | 2/1951 | Eklund | 295/11 |
| 2,659,622 | 11/1953 | Watter | 295/11 |

FOREIGN PATENT DOCUMENTS 1154823 9/1963 Fed. Rep. of Germany ............. 295/11
8520 of 1840 United Kingdom ..................... 295/15

Primary Examiner—H. Grant Skaggs
Attorney, Agent, or Firm—Robert S. Lipton; Jack D. Puffer; Arthur E. Oaks

[57] ABSTRACT

A resilient wheel is provided comprising a hub and web having a rim mated to and resiliently bonded to the web with an elastomeric adhesive. Depending on the application the outer circumference of the rim may have a flange machined into it so that it serves as the tire for the wheel or machined smooth to accept a separate tire. To prevent the rim from shifting relative to the web as the elastomeric adhesive ages, a plurality of locking pins are inserted through the rim and bond line into the web and bonded into place. The rim is thus effectively prevented from shifting even if the adhesive substantially or even totally disbonds from the mated parts. Several variants of these locking pins are possible to achieve improved economy for maintenance purposes or improved longevity of the wheel.

5 Claims, 4 Drawing Figures

RESILIENT FLANGED WHEEL

BACKGROUND OF THE INVENTION

1. Field of the Invention

This invention relates to wheels and more particularly to improved resilient wheels for railroad, trolley and similar rail tracked vehicles.

SUMMARY OF THE INVENTION

One particular problem in the production of wheels for advanced design rail tracked vehicles such as railroad and trolley cars is that of improving riding quality. One widely used approach to doing this is the use of resilient wheels. In these, the metal rim and tire used are isolated from the center hub by one or another shock absorbing means. When properly designed such means have been found not only to produce a smoother ride, but also to significantly reduce maintenance costs for both the wheels and the rails upon which they roll. They do this by reducing noise, vibration, shock impact both between the tire and rail and the tire and hub and thermal and mechanical stresses in both the tire and hub. A review of the state of the art reveals both that the advantages of this approach have been recognized for some time and a variety of techniques have been developed to achieve these advantages. The wide range of these techniques is shown in the U.S. Pat. Nos. 1,839,237 issued to Lord in 1932, 2,203,965 to Mampo in 1940, 2,470,885 to Barrows in 1949, 2,548,839 to Crombes in 1951, 2,659,622 to Watter in 1953, 3,251,624 to Mede in 1966, 3,330,592 to Mede in 1967, and 3,986,747 to Raquet in 1976.

Of these, the types described by Watter and Mede have achieved a wide range of use in wheels for both urban and interurban passenger transportation uses such as train passenger, subway and trolley cars. In these the tire or rim is screwed onto the web of a center hub assembly. The fit of the mating helical screw threads is made to be relatively loose so that a substantial quantity of shock absorbing material such as rubber or an elastomeric polymer can be injected or inserted into the interstitial volume between the tire and web. When set, the absorber adhesively bonds the two components together to produce a composite wheel which is found to have significantly improved properties as compared to fully monolithic wheels. However, it is also found that these wheels do not retain these properties indefinitely. Rather, due to degradation in the properties of the shock absorber, the riding quality of the wheel steadily deteriorates. For example, if overloaded or standing still for long periods of time, the elastomer may take on a permanent set causing the wheel to be asymetric and a source of vibration. Much more serious is the tendency of the adhesive bond line to deteriorate and eventually fail in shear. When this happens, the relatively loose fit of the matching screw threads will allow the rim to shift on the web to which it is attached which can result in damage to the wheel, the track, especially switches and, in extreme cases, derailment.

The subject invention is designed to prevent this problem. In use it comprises a plurality of locking pins which are inserted through the rim into the web and bonded into place. When used, they prevent the rim from shifting even if the elastomer should completely debond on both sides of its bond line. Several variations of this approach are possible. Furthermore, as described herein below, any of them can be readily applied to existing wheels as a retrofit to refurbish them and extend their useful life by a considerable margin at a very reasonable cost.

It is therefore the object of the present invention to provide means for locking the rims of resiliant wheels so that the rims cannot shift if the bond line fails.

It is still another object of the present invention to provide locking means which can be installed, at low cost both at the time of wheel fabrication and as a field retrofit for wheels being refurbished after some period of service.

Other and further objects of this invention will become apparent to those skilled in the art upon consideration of following specification when read in conjunction with the attached drawings in which like numerals refer to like parts.

DESCRIPTION OF THE PREFERRED EMBODIMENT

Figure 1:
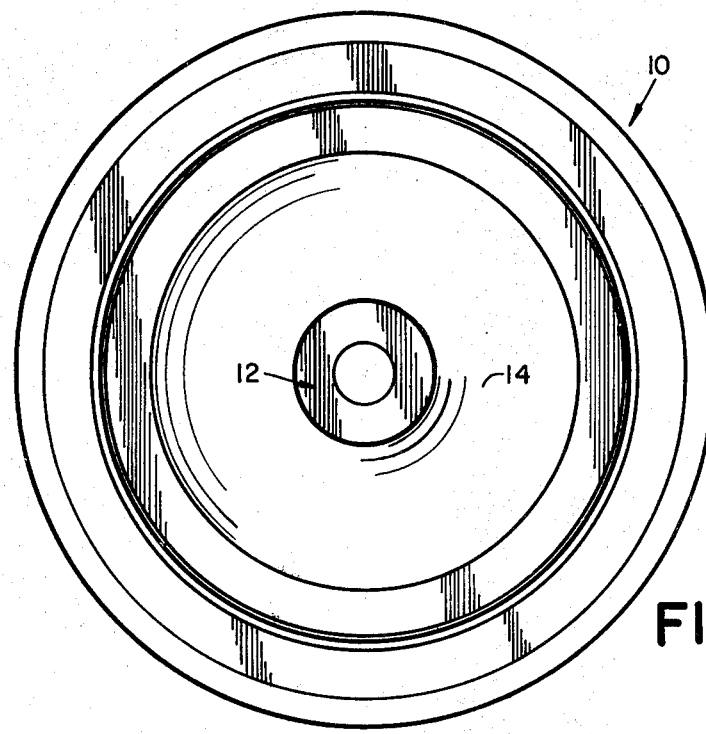
FIG. 1 is an elevational view of a wheel from a tracked vehicle such as a trolley car.

Referring now to FIG. 1 we see typical wheel 10 used for rail type vehicles such as railroad passenger, trolley and subway cars. This consists of a center hub 12 which fits onto and rotates about an axle (not shown), and a web 14. As shown more clearly in FIGS. 2, 3 and 4, this web widens out at its outer periphery to form a landing for a male half of helical threaded connection 16. The mating female thread is mahined onto the inner circumference of the rim 18 such that it can be screwed onto the web to form a basic wheel. If the wheel is intended for a more or less "conventional" railroad or mass transit car, connection 16 is made close so that the fit is tight and the outer circumference 20 of the rim is machined with the necessary flange so that it acts as the tire for the wheel. When a tire shows excessive wear, it is simply unscrewed or cut off and a replacement rim/tire put back on the web. This is a major point of economy for these wheels since it reaches down time for refurbishing by a considerable margin.

Where, however, it is necessary to provide some measure of protection from road shocks coming from misaligned rails, out-of-round wheels and similar hazards, such wheels are often found to be inadequate. In such cases a "resilient" wheel is often used. In these, connection 16 is made fairly loose so that an appreciable volume will exist between the mating threads. "Resiliency" can then be inparted by placing or injecting a layer 22 of rubber or a suitable synthetic elastomeric adhesive polymer such as silicone or polysufulide rubber in the interstitial volume between the threads. Where the elastomer is injected, a sufficient quantity is used to fill completely the interstitial volume. Furthermore, the thread surfaces are usually primed so that the material will bond to both sets of threads so that they form an integrated solid connection between the web and rim having an appreciable shock absorbing capability. Where the wheel is used as the electrical ground of the car for power transfer or signaling purposes, the insulation properties of the elastomer necessitate that a jumper 24 be used to bridge the gap thus created.

Figure 4:
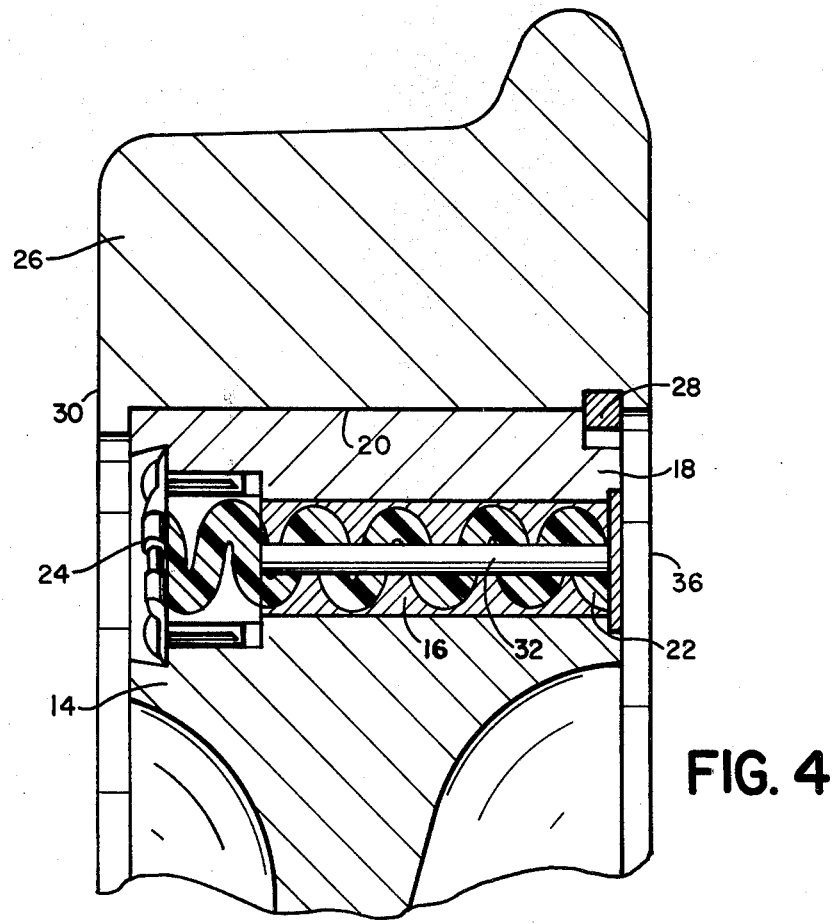
FIG. 4 is a cross section of the connection between the hub and rim of a resiliant wheel showing a third embodiment of the present invention.
Figure 2:
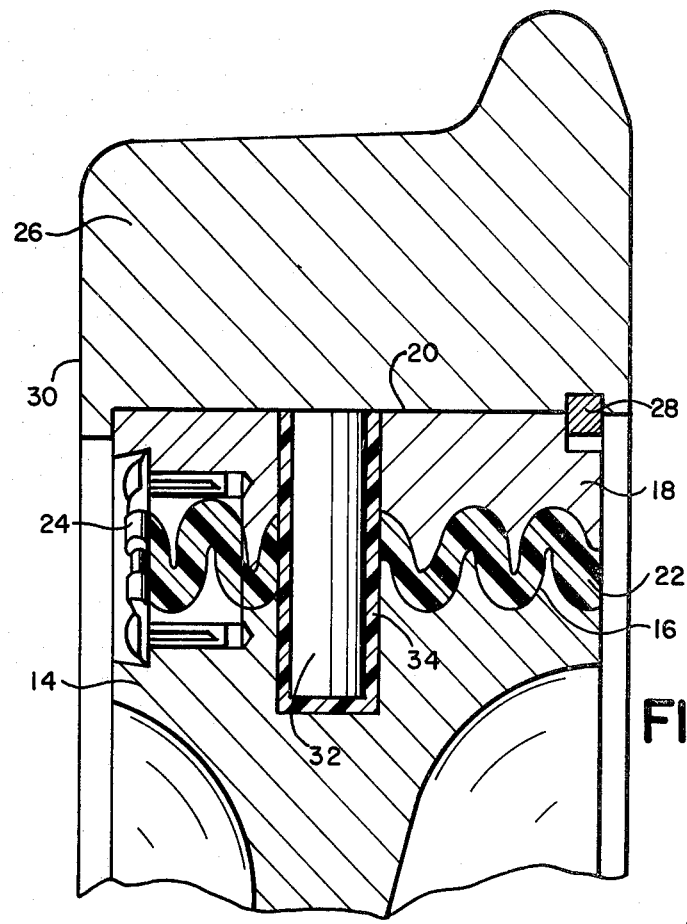
FIG. 2 is a cross section of the connection between the hub and rim of a resiliant wheel showing one embodiment of the present invention.
Figure 3:
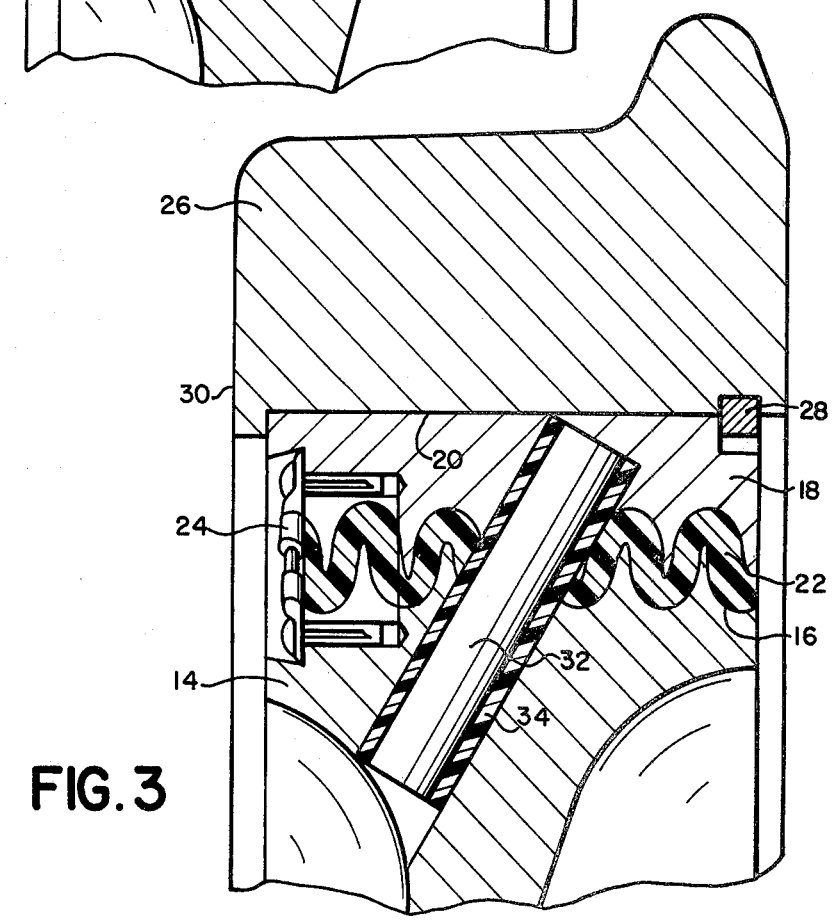
FIG. 3 is a cross section of the connection between the hub and rim of a resiliant wheel showing a second embodiment of the present invention.

For many uses the bonded assembly can be applied in the same manner as noted above for a "standard" wheel. However, for for applications such as advanced trolley cars and interurban mass transit carriers, separate flanged steel tires 26 placed on the outside of rim 18 have been found to provide a marked reduction in maintenance time and costs. Such a system is shown in FIGS. 2, 3 and 4. These tires are not bonded in place but rather slide into place over the flat machined outer periphery 20 of rim 18. They are held in place with a retaining ring 28 on one side and shoulder 30 on the other. When replacement of the tire is required, it can be easily removed and replaced often without removing the wheel from the vehicle to which it is attached. By so doing, the elastomeric filler in connection 22 is not disturbed or damaged during such replacement. This is an important feature contributing to an increased operating life for these wheels.

All this works very well as long as the elastomeric bond line of connection 22 remains intact. However, as can be seen clearly in FIG. 2 while the rubber is in compression under load primary stress on the two bond lines is shear loading which, under the particular design used can be quite severe. As a result, as the elastomer ages, its ability to withstand repetitive shear loading in the bond line steadily declines until bond failure or disbonding sets in. It is important to note that this can happen to the elastomer even though a substantial residual ability to handle compressive loads still exists. In severe cases, the elastomer will disbond on both sides all the way around so that while it still fills the interstitial volume in connection 16, web 14 and rim 18 are no longer integrated and are free to move about relative to each other. Depending on the nature of the loads encountered such motion might be horizontal, that is the rim can move from side to side relative to the web. In other cases, the web could unscrew itself from the tire. In either instance the tire will be misaligned with the track on which it rides so that it will, at best, wear more quickly and, at worst, show an enhanced tendency to derail when going around sharp curves or entering switches.

It has been found that with the use of the present invention, it is possible to prevent this problem from occurring. This comprises the installation of a plurality of locking pins 32 disposed around the periphery 20 of rim 18 and web 14. The pins 32 prevent excessive lateral and rotational movement of the rim 18 relative to the web 14 in the event of disbonding of the bond line 16.

There are several embodiments of the invention. The first, shown in FIG. 2, is to drill vertical holes vertically through the matching parts insert and then elastomerically bond high strength steel pins 32 into place. However, the bond line 34 used here is also subject to the same aging problems as noted above and can similarly fail. While in use the external tire 26 will prevent the pins from falling out, rebonding will be necessary when tire 26 itself must be replaced. This partially defeats the economic advantage of this basic construction since it will require that the whole wheel be removed to effect ruin repair. One way of avoiding this problem is to place the locking pins in at an angle as shown in FIG. 3. This reduces the shear bearing forces on the pin bond line which tends to preserve bond strength over much longer periods of time. Still another approach, shown in FIG. 4, is to place the pins in horizontally from the side 36 of the wheel directly through both sets of matching screw threads. This over-comes many potential problems with pin loosening and will keep the wheel functional for quite some time after the bond line fails. Thus it is apparent that there has been provided, in accordance with the present invention, a resiliant flanged wheel that fully satisfies the objects and advantages set forth above.

The present invention may be embodied in other specific forms without departing from the spirit or essential attributes thereof and accordingly reference should be made to the appended claims rather than to the foregoing specification as indicating the scope of the invention.

What is claimed is:

1. A wheel comprising:
    a center hub;
    a web integral with and disposed around said hub;
    a rim disposed around said web;
    a tire connected to and disposed around said rim;
    connection means for attaching said rim to said web, said means comprising an elastomer adhesively bonded to mating helical threads on the outer circumference of said web and the inner circumference of said rim; and
    locking means connected to said rim and said web by an elastomeric material and passing through said connection means, whereby said rim is prevented from shifting its position relative to said web in the event that said elastomer disbonds.

2. The wheel of claim 1 wherein said locking means comprises a plurality of pins, placed around the outer circumference of said rim such that they pierce the rim and extend through said rim and said connection into said web, said pins being locked into place by a polymeric bond and further being of sufficient length, diameter and strength to prevent said rim from shifting its position relative to said web when the bond of said elastomer fails.

3. The wheel of claim 1 wherein said locking means comprises a plurality of vertical pins placed around and at 90 degrees to the outer circumference of said rim, said pins being inserted through said rim such that they extend entirely through said rim and said elastomeric bond line into said web, and further being of sufficient length, diameter and strength to prevent said rim from shifting its position relative to said web when the bond of said elastomer fails, and maintained in place by said tire.

4. The wheel of claim 1 wherein said locking means comprises a plurality of horizontal pins placed around the side of said wheel such that they pierce said side through said mating threads, said pins being locked into place by a polymeric bond and further being of sufficient length, diameter and strength to prevent said rim from shifting its position relative to said web when the bond of said elastomer fails.

5. The wheel of claims 1, 2, 3 or 4 wherein the interior surface of said tire includes a groove, and wherein the exterior surface and outer end of said rim includes a shoulder, said shoulder being aligned with said groove, and wherein said wheel further includes a retaining ring which is adapted to fit within said groove and abut said shoulder so as to prevent relative lateral movement between said tire and said rim.

* * * * *